(12) United States Patent
Gerard et al.

(10) Patent No.: US 6,339,782 B1
(45) Date of Patent: Jan. 15, 2002

(54) PERSISTENCE MECHANISM AND METHOD FOR OBJECTS

(75) Inventors: Scott Neal Gerard; Steven Lester Halter, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/975,747

(22) Filed: Nov. 21, 1997

(51) Int. Cl.[7] ................................................ G06F 9/54
(52) U.S. Cl. .......................................... 709/1; 709/316
(58) Field of Search .............................. 709/1, 310–320, 709/203, 217; 717/1

(56) References Cited

U.S. PATENT DOCUMENTS

| | | | | |
|---|---|---|---|---|
| 6,035,119 A | * | 3/2000 | Massena ......................... | 717/1 |
| 6,216,152 B1 | * | 4/2001 | Wong et al. ................. | 709/203 |
| 6,272,536 B1 | * | 8/2001 | Van Hoff et al. ........... | 709/217 |

OTHER PUBLICATIONS

Kleindienst et al, "Lessons Learned From Implementing the CORBA Persistent Object Service"; OOPSLA '96 ACM digital library, pp 150–167, 1996.*

David Channon; "Persistence for C++", Dr. Dobb's Journal; v21 n10 p46(7), Oct. 1996.*

Author Unknown, "Java Object Persistence: Technical Overview", Sep. 1996.*

Atkinson et al, "An Orthogonally Persistent Java" ACM, Dec. 1996.*

Morrison et al, "Can Java Persist", First International Workshop on Persistence and Java, Sep. 16–18, 1996.*

Java Soft, Java Native Interface Specification, May 1997.*

Daniel Berg, "Java Threads : A White Paper", Mar. 1996.*

Crawley et al; "Orthogonal Persistence & Ada" ACM, pp 298–308, Feb. 1994.*

Mick Jordan, "Early Experiences With Persistent Java", First International Workshop on Persistence & Java, Sep. 16–18, 1996.*

Atkinson et al, "Design Issues for Persistent Java : A type–safe, Object–oriented, Orthogonally Persistent System", Mar. 1996.*

* cited by examiner

*Primary Examiner*—St. John Courtenay, III
(74) *Attorney, Agent, or Firm*—Schmeiser, Olsen & Watts, LLP; S. Jared Pitts

(57) ABSTRACT

A method and apparatus for providing persistence in a Java environment is provided. The method and apparatus provide object persistence in way that can be adapted for use in a wide variety of situations. In accordance with the preferred embodiment a StoragePlugin class is defined which includes the methods needed to provide orthogonal persistence in the Java environment. StoragePlugin objects are then instantiated as needed from the StoragePlugin class. Each StoragePlugin object implements the defined methods in a way that is compatible with a particular persistent storage system that is to be used (i.e., a particular hardware and database system).

64 Claims, 4 Drawing Sheets

```
class StoragePlugIn {

// The JVM calls these functions to allocate or delete objects.
    // newObject is called by the "new" bytecode.
    // destroyObject is called by the garbage collector.
    //
    virtual JavaObject& newObject(JavaClass cls) = 0;
    virtual void        destroyObject (JavaObject obj) = 0;

// also/alternatively use this new method.
    //
    virtual JavaObject& newObject(JavaClass cls, int userValue) = 0;

// The JVM calls these functions to get and put field data.
    // There is one set of these methods for each Java primitive data type.
    // (X represents the data type).
    // virtual void getX(JavaObject obj, filed f, X value) = 0;
    virtual void putX (JavaObject obj, filed f, X value) = 0;

//
    virtual void getXArray(JavaXArray array, int index, X value) = 0;
    virtual void putXArray(JavaXArray array, int index, X value) = 0;

// The JVM calls these methods for synchronize{} blocks,
    // and for synchronized methods (note synchronized method
    //routing does not go thru the monitorenter or monitorexit
    // byte-codes).
    //
    virtual void monitorenter (JavaObject obj) = 0;
    virtual void monitorexit  (JavaObject obj) = 0;

//Overloaded versions of monitor enter/exit that support
    // a single, plugin-defined "lock level".
    //
    virtual void monitorenter (JavaObject obj, int lockLevel) = 0;
    virtual void monitorexit (JavaObject obj, int lockLevel) = 0;
};
```

FIG. 3

PERSISTENCE MECHANISM AND METHOD FOR OBJECTS

BACKGROUND OF THE INVENTION

1. Technical Field

The present invention relates in general to object-oriented computer systems. More specifically, the present invention relates to the field of Java object-oriented systems.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

Java is a modern object-oriented programming language specially designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is completely platform independent. A Java program can be written once and ran on any type of platform that contains a Java Virtual Machine (JVM). And third, Java is an object-oriented language, meaning that software written in Java can take advantage of the benefits of object-oriented programming.

One issue in object oriented programming, and Java programing in particular, is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a persistent mixin class of objects. In this approach all objects for which persistence is desired must have this persistent mixin class as a superclass somewhere in their class's inheritance lattice. Because a mixin class is required in the inheritance lattice, this method for providing object persistence cannot be used to provide persistence in a way that is orthogonal (i.e., independent) to the class of the object. Because the object persistence is not orthogonal to its class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object into a local data store in a format compatible with the local data store. When the object is needed again, the externalized state data is internalized into an object, creating an exact copy of the object as it previously existed. Unfortunately, the process of externalizing the state data for storage and then internalizing it again when needed takes an excessive amount of processing time and thus slows performance in a way that can be unacceptable in many applications.

As the use of the Java programming language increases, the need for a persistent object mechanism that works becomes more apparent. Without a mechanism that can be used to efficiently provide persistent objects in a Java programming environment, the computer industry will never fully realize the potential of the Java language.

DISCLOSURE OF INVENTION

According to the present invention, a method and apparatus for providing persistence to programming languages that do not have their own persistence storage systems, such as Java, is provided. The preferred method and apparatus utilize a Java object persistence mechanism to provide object persistence in way that can be adapted for use in a wide variety of situations. In the preferred embodiment, the Java object persistence mechanism is implemented by defining a StoragePlugin class of objects. The class of objects includes the methods needed to provide orthogonal persistence in the Java environment. StoragePlugin objects are then instantiated as needed from the StoragePlugin class. Each StoragePlugin object implements the defined methods in a way that is compatible with a particular persistent storage system that is to be used (i.e., a particular hardware and database system).

BRIEF DESCRIPTION OF THE DRAWINGS

FIG. 3 is program portion defining the preferred StoragePlugin commands; and

DESCRIPTION OF THE PREFERRED EMBODIMENTS

Figure 1:
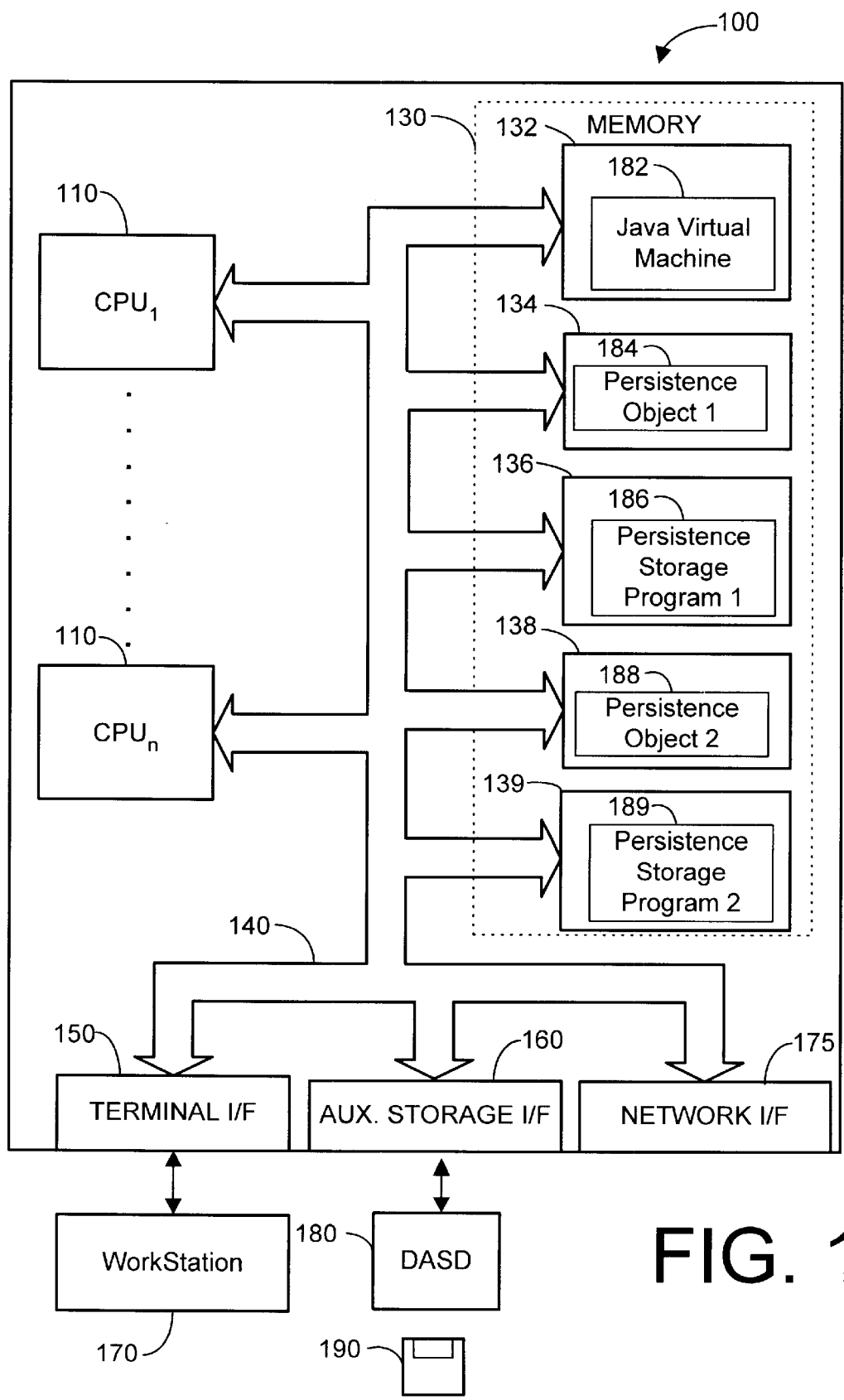
FIG. 1 is a schematic view of a computer system in accordance with a preferred embodiment of the present invention.

A method and apparatus for providing object persistence in a Java operating environment is provided. In the preferred embodiment a StoragePlugin class is defined which includes the methods needed to provide orthogonal persistence in the Java environment. StoragePlugin objects are then instantiated as needed from the StoragePlugin class. Each StoragePlugin object implements the defined methods in a way that is compatible with a particular persistent storage system that is to be used. An overview of Object-Oriented Technology and the Java Programming Language will now be provided, followed by a detailed description of the preferred embodiments.

Overview—Object-Oriented Technology

Object oriented programming based on an object model is a new way of programming computers that has become very popular over the past several years. Computer programs written in object-oriented languages are known as object-oriented programs. Object-oriented programming differs from standard procedural programming in that it uses objects, not procedures, as its fundamental building blocks. This difference stems from the fact that the design focus of object-oriented programming technology is wholly different than that of procedural programming technology. The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects.

Conceptually, an object has two parts, an external object interface and internal object data. Internal data is encapsulated by the object interface such that other objects must communicate with that object through its interface. Thus, the only way to retrieve, process or otherwise operate on the encapsulated data is through methods defined on the object. This protects the internal portion of the object from outside tampering. Additionally, because outside objects have no access to the internal implementation, that internal implementation can change without affecting other aspects of the program. The object system thus isolates the requestor of services (clients) from the providers of services by a well defined encapsulating interface.

Data in an object is operated upon by calling "methods" on the object. In the object model, a client object sends a call to the server object system. The call identifies a particular object and specifies what method is to be performed by the object, and provides any parameters required. The object interprets the message to decide what service to perform, and returns back any data that results.

Because all operations on an object are expressed as calls from one object to another, methods can be called by remote objects. Objects that reside in different locations that communicate with each other across a network are called distributed objects in a distributed object system.

Another central concept in object-oriented programming is the class. A class is a template that defines a type of object. A class is defined by a set of class parameters that specify the details of objects that belong to its class. By defining a class, objects can be created that belong to the class without having to rewrite the entire definition. This promotes the reusability of existing definitions and promotes efficient use of program code.

There are many computer languages that support object-oriented programming. For example, Smalltalk, Object Pascal, C++ and Java are all programming languages that to one degree or another support object-oriented programming. Any of these and others can be used to write programs that use objects.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed. Unfortunately, the process of externalizing the state data for storage and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Overview—Java

Java is a modern object oriented programming language specially designed to create distributed object systems. Java offers many features and advantages that makes it a desirable programming language to use. First, Java is specifically designed to create small programs, commonly called applets, that can reside on the network in centralized servers, and delivered to the client machine only when needed. Second, Java is completely platform independent. A Java program can be written once and run on any type of platform that contains a Java Virtual Machine (JVM). And third, Java is an object oriented language, meaning that software written in Java can take advantage of the benefits of object oriented programming.

A program written in Java is first compiled into bytecodes using the Java Compiler. Bytecodes are platform independent commands that can be interpreted and run by a JVM. The JVM is a virtual computer that must be implemented for each platform on which the Java program must be run. The JVM provides a layer of abstraction between the compiled bytecodes and the underlying hardware platform and operating system.

Java bytecodes include two parts, a one-byte opcode, which is a specific and recognizable command, and zero or more operands which contain the data needed to complete the opcode. When the JVM executes a program it takes the java bytecodes and interprets or converts them to machine code instructions for the underlying hardware, and passes the machine code instructions to the CPU for execution. By working in such a manner, Java programs can be written once and run on any platform for which a JVM is available.

One limitation that prevents Java from fully reaching its potential is the unavailability of mechanism to provide orthogonal persistence to Java objects. In particular, current methods for providing persistence to Java objects rely on the use of persistent object mixin classes or externalization/internalization procedures, neither of which is a fully acceptable method of efficiently providing persistence in a way that is orthogonal to class.

As the use of the Java programming language increases, the need for a persistent object mechanism that provides orthogonal persistence to Java objects becomes greater. Without a mechanism that can be used to provide orthogonal persistence to Java objects in a Java programming environment, the computer industry will never fully realize the potential of the Java language. The remainder of this specification discloses the preferred method and apparatus for providing orthogonal persistence to Java objects.

DETAILED DESCRIPTION

Referring now to FIG. 1, a computer system 100 in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a bus 140; and a memory 130 which includes multiple locations for containing various software programs. In this example, memory 130 includes a Java Virtual Machine 182 running in location 132, a persistence object 1 184 residing in location 134, a persistence storage program 1 186 running in location 136, a persistence object 2 188 residing in location 138, and a persistent storage program 2 running in location 139.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and CPUs 110 may be distributed across several different computers that collectively comprise system 100. For example, Java Virtual Machine 182 may reside on one computer with $CPU_1$ and persistence storage system 1 186 may reside on another computer system with a separate $CPU_2$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and materials for connecting computer systems and components will be readily adapted for use with the present invention. This would include those methods and materials not presently known but developed in the future.

Terminal interface 150 allows human users to communicate with system 100, normally through a workstation 170. Workstation 170 is preferably a computer system such as an IBM PS/2 personal computer, RS/6000 or an AS-400 computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a floppy disk drive which is capable of reading and writing programs or data on a floppy disk. DASD 180 may also be any other type of DASD known to those skilled in the art. This would include CD-ROM drives, hard disk drives, optical drives, etc.

Network interface 175 is used to connect other computer systems and/or workstations to computer system 100 in networked fashion. In the preferred embodiment the network interface 175 provides a connection to the Internet and the World-Wide-Web, but could also be to connect to other networked environments, such as internal web-based systems (typically called Intranets). The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks 190, CD-ROMs and transmission type media such as digital and analog communication links.

Figure 2:
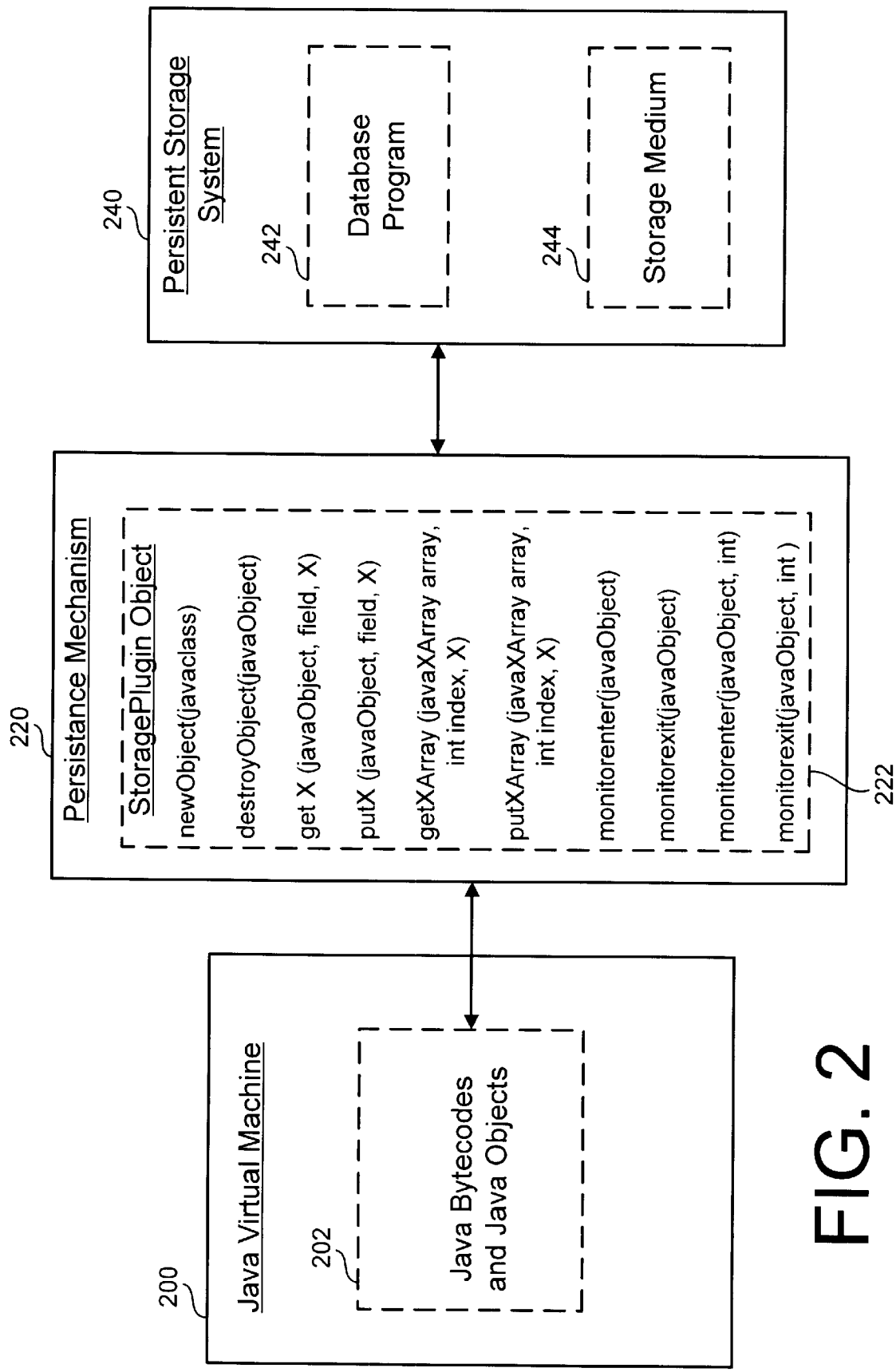
FIG. 2 is a functional block diagram illustrating a persistence system in accordance with the preferred embodiment.

Referring now to FIG. 2, a Java Virtual Machine (JVM) 200, a persistence mechanism 220 and a persistence storage system 240 are illustrated in a functional block diagram to better illustrate the preferred embodiment of the present invention. The JVM 200 includes a collection of Java bytecodes and Java objects 202 which make up an object-oriented Java program.

Persistence storage system 240 provides an apparatus to store and retrieve persistent objects. It is an advantage of the preferred embodiment that any type of data storage system can be used as the persistence storage system 240. In particular, a wide variety of hardware and software systems can be used in the preferred embodiment.

The preferred storage system 240 would include a database program 242 and a storage medium 244. The storage medium 244 could comprise any suitable storage medium, such as hard disk drives, optical disks, etc. The database program 244 could comprise any suitable database program, but preferably comprises an object oriented database program, but other systems such as relational databases can also be used. When a persistent object is created by persistence mechanism 220 it is stored on the persistence storage system 240 until it is destroyed.

In accordance with the preferred embodiments, persistence mechanism 220 is provided that interfaces with JVM 200 and persistence storage system 240 to facilitate the creation, use and deletion of persistent Java objects in a way that is orthogonal to the class of the object. Persistence mechanism 220 preferably comprises at least one Storage-Plugin object 222 which serves to implement persistence mechanism 220. StoragePlugin object 222 includes a plurality of commands which are designed to facilitate the creation, use and destruction of persistent Java objects. These commands preferably include: a newObject (javaclass) command; a destroyObject(ObjectID) command; getX(javaObject obj, field f, X value) commands; putX (javaObject obj, field f, X value) commands; getXArray (javaXArray array, int index, X value) commands; putXArray(javaXArray array, int index, X value) commands; a monitorenter (javaObject) command; a monitorexit(javaObject) command; monitorenter (javaObject, int) command; and a monitorexit (javaObject, int) command. These commands would typically be called by the JVM when operations with persistent objects are required.

When the newObject(javaclass) command on the StoragePlugin object 222 is called it creates a new persistent object of the specified class. This suitably would involve the allocation of storage both inside the JVM 200 and inside the persistent storage system 240. In particular, a referencing object is stored in JVM 200 that points to the real persistent object in persistent storage system 240. Likewise, when the destroyObject(ObjectID) command on the StoragePlugin object 222 is called it destroys the specified persistent object and frees the memory and/or other storage in which the object was kept.

The getX(javaObject obj, field f, X value) commands are used to get data out of the specified persistent object, where Xspecifies the type of data and can include any of the Java primitive data types (e.g., an integer, a character, a floating point number, a double, a long integer, and an reference pointer to an object.). Likewise, the putX(javaObject obj, field f, X value) command puts data into the specified persistent object, where X specifies the type of data and can include any of the Java primitive data types.

The getXArray(javaXArray array, int index, X value) commands get data from the specified persistent array, where X specifies the type of data and can include any of the Java primitive data types (e.g., an integer, a character, a floating point number, a double, a long integer, and an reference pointer to an object). Likewise, the putXArray (javaXArray array, int index, X value) commands put data into the specified persistent array, where X specifies the type of data and can include any of the Java primitive data types.

The monitorenter(javaObject) command locks the specified object to prevent other objects from being able to read or write any data from the object. Likewise, the monitorexit (javaObject) command unlocks the specified object to allow reading and writing by other objects.

The preferred embodiment also includes a monitorenter (javaObject, int) command and a monitorexit (javaObject, int) command which each include parameters to facilitate different levels of locking and unlocking. In particular, the int parameters in these commands allow persistent objects to be specified as fully unlocked, write locked (allowing reading but preventing writing) and fully locked (preventing reading and writing). These additional commands add increased flexibility over the monitorenter(javaObject) and monitorexit(javaObject) commands which only allow an object to be fully locked (read and write) or fully unlocked.

Thus, the preferred StoragePlugin object 222 includes all the methods necessary to act upon persistent objects. The StoragePlugin object 222 thus provides a mechanism by which orthogonal persistence can be provided to Java objects.

Turning to FIG. 3, a program interface 300 is illustrated that can be used to define a class to which the StoragePlugin objects belong. The program interface 300 defines the class of objects by defining the methods that are to exist on objects of that class. These methods include those discussed above with reference to FIG. 2. These methods are virtual in the program 300 that defines the class, thus requiring that they be implemented in sub-classes and objects of the StoragePlugin class. Thus, any StoragePlugin class derived from this class is required to implement these methods. This assures that all StoragePlugin objects have a consistent interface. Different implementations of the interface accommodate different hardware and software platforms in the Persistent Storage System 240. Thus, by using the program interface 300 to define a class of StoragePlugin objects with the specified methods, and then implementing those methods in particular StoragePlugin sub-classes, a system is provided that facilitates orthogonal persistence in a consistent manner while using a wide variety of hardware and software platforms. Furthermore, by implementing these multiple StoragePlugin subclasses, with each StoragePlugin sub-class designed to work with a different storage platform, and then instantiating multiple StoragePlugin objects from each sub-class, a system is created that allows one JVM system to access multiple databases of multiple types to provide Java object persistence.

As an example, a first StoragePlugin sub-class can be implemented for relational databases and a second sub-class implemented for object-oriented databases. Two objects of the relational database StoragePlugin sub-class can then be instantiated for two different relational databases. Likewise, three objects of the object-oriented database StoragePlugin sub-class can then be instantiated for three different object-oriented databases. A Java programmer can then use the five StoragePlugin objects to simultaneously access persistent Java objects in five different persistent databases. Thus, the preferred embodiment provides great flexibility in database usage while providing a consistent interface for persistent objects.

In the preferred embodiment, the computer language used to define and implement the StoragePlugin class depends upon the environment in which the system is to operate. In particular, the programming language is preferably selected to have good performance and be compatible with the hardware and software selected for the Persistence Storage System 240. For these reasons, the program 300 is most preferably written in the C++ programming language. The C++ program 300 defines a C++ object which resides in the JVM and has access to the internals of the JVM structure. Because it is written in C++, the program must be implemented and complied specifically for the platform in which it is to be used. This dramatically improves the performance of the program compared to implementing the StoragePlugin object in Java. Of course other program languages could be used to define the StoragePlugin class, such as C or assembler, and those skilled in the art will recognize that any compiled language would be suitable. The Java programming language itself could be used to define and implement the StoragePlugin objects but it is generally not preferable because of slower database performance which results from interpreting Java.

Thus, by using the StoragePlugin class to define these base methods while leaving the implementation of these methods up to the instantiated object, a persistence mechanism is provided that can be adapted for use with a wide variety of hardware and software platforms.

For the preferred embodiment of the present invention to be implemented in the preferred manner, several changes need to made to the Java programming language and Java Virtual Machine. One desirable change is to add a parameter to all Java objects which can specify whether an object is a persistent object, and if it is a persistent object, which StoragePlugin object it belongs to. For example, a two bit parameter would be able to specify a transient object (00) and three different StoragePlugin objects (01, 10, and 11). Such a parameter could be checked whenever an operation is performed which could be affected by the persistent nature of an object. In this preferred embodiment, when a new StoragePlugin object is instantiated on a system it is assigned one of the available parameters, and all objects created by this StoragePlugin are given the same parameter.

An alternative to adding StoragePlugin specifying parameters to each Java object is to add a field to the Java objects which provides a pointer to the StoragePlugin object. This method would have the advantage of easily allowing Java programmers to find the StoragePlugin for each persistent object.

Another desirable change is to modify the new( ) java operator and its corresponding new( ) bytecode, which create new object instances of the specified class, to include parameters which specify whether or not the new object is to be persistent. If the new object is to be persistent, new( ) operator should specify the StoragePlugin object that is to create the persistent object. When compiled and run by the JVM, the new( ) bytecode should call the newObject (javaclass) method on the StoragePlugin object, with the class of the new object specified as a parameter. The StoragePlugin object then creates the specified new object. If the new object is not to be persistent, the new( ) bytecode creates regular transient object of the specified class.

If the new( ) java operator and the corresponding new( ) bytecode are not parameterized as described above, programmers can use the StoragePlugin objects by using native methods to call newObject. Native methods are non-Java methods that are implemented in C, C++, and other languages. Native methods can provide the desired functionality, although with diminished performance over the preferred method.

Another desirable change to fully implement the preferred embodiment is to modify the garbage collector of the JVM. The garbage collector of the JVM keeps track of the references to each object on the heap (the portion of memory where objects are stored in the JVM) and automatically frees the memory occupied by objects that are no longer referenced. In the preferred embodiment the garbage collector is modified to recognize when an object is a persistent object corresponding to a particular StoragePlugin object. When the object to be destroyed is a persistent object, the garbage collector calls the destroyObject( ) method on the associated StoragePlugin object, which then destroys the specified object.

Another desirable change to fully implement the preferred embodiment is to modify the monitorenter( ) and monitorexit( ) bytecodes. The monitorenter( ) and monitorexit( ) bytecodes are used by the JVM to lock and unlock objects as they are accessed by other objects. When an object is locked, it cannot be accessed by any other object until it is unlocked. In the preferred embodiment, the monitorenter( ) and monitorexit( ) bytecodes are modified to call the monitorenter( ) and monitorexit( ) commands on the associated StoragePlugin object when the object to be locked or unlocked is a persistent object. When the bytecode calls the appropriate method, the StoragePlugin object then performs the locking/unlocking operation as described above.

Another change to the monitorenter( ) and monitorexit( ) bytecodes which is desirable is to parameterize the bytecodes to facilitate different levels of locking and unlocking. These parameters would preferably correspond to those specified for the monitorenter(javaObject int) and monitorexit(javaObject int) commands on the StoragePlugin objects. The current JVM bytecodes allow an object to be either fully locked (i.e., read and write by other objects prevented) or fully unlocked (i.e., read and write by other objects allowed). With the bytecodes parameterized, objects could be write locked while read unlocked.

To facilitate the use of these modified monitorenter( ) and monitorexit( ) bytecodes, the base programming-level synchronize(javaObject) command would also be modified to accept the lock level parameters (i.e., synchronize (javaObject, locklevel)) and to call the appropriate monitorenter( ) and/monitorexit( ) bytecodes with the lock-level parameter when interpreted.

Another desirable change needed to fully implement the preferred embodiment is to modify the getfield( ) and putfield( ) bytecodes. These bytecodes respectively get and put values of the corresponding data type from an object. In the preferred embodiment, the getfield( ) and putfield( ) bytecodes are modified to recognize when the object in question is a persistent object. When the object is a persistent object, the bytecodes call the corresponding getX( ) and putX( ) commands on the associated StoragePlugin object. The StoragePlugin object then performs the get/put operation as described above, and returns any required value. The bytecodes can then complete their normal function.

Another desirable change needed to fully implement the preferred embodiment is to modify the iaload( ), faload( ), laload( ), daload( ), aaload( ), baload( ), caload( ) and saload( ) bytecodes. These bytecodes use stack manipulation to get integer, floating point, long, double, address, boolean, character and string data from a particular array. In the preferred embodiment these bytecodes are also are modified to retrieve this data from persistent objects by calling the appropriate getXarray( ) command on the StoragePlugin object when needed. In a similar manner the iastore( ), fastore( ), lastore( ), dastore( ), aastore( ), bastore( ), castore( ) and sastore( ) bytecodes, which are used to put data into arrays using stack manipulation, are preferably modified to call the putXarray( ) command on the StoragePlugin object when needed.

Figure 4:
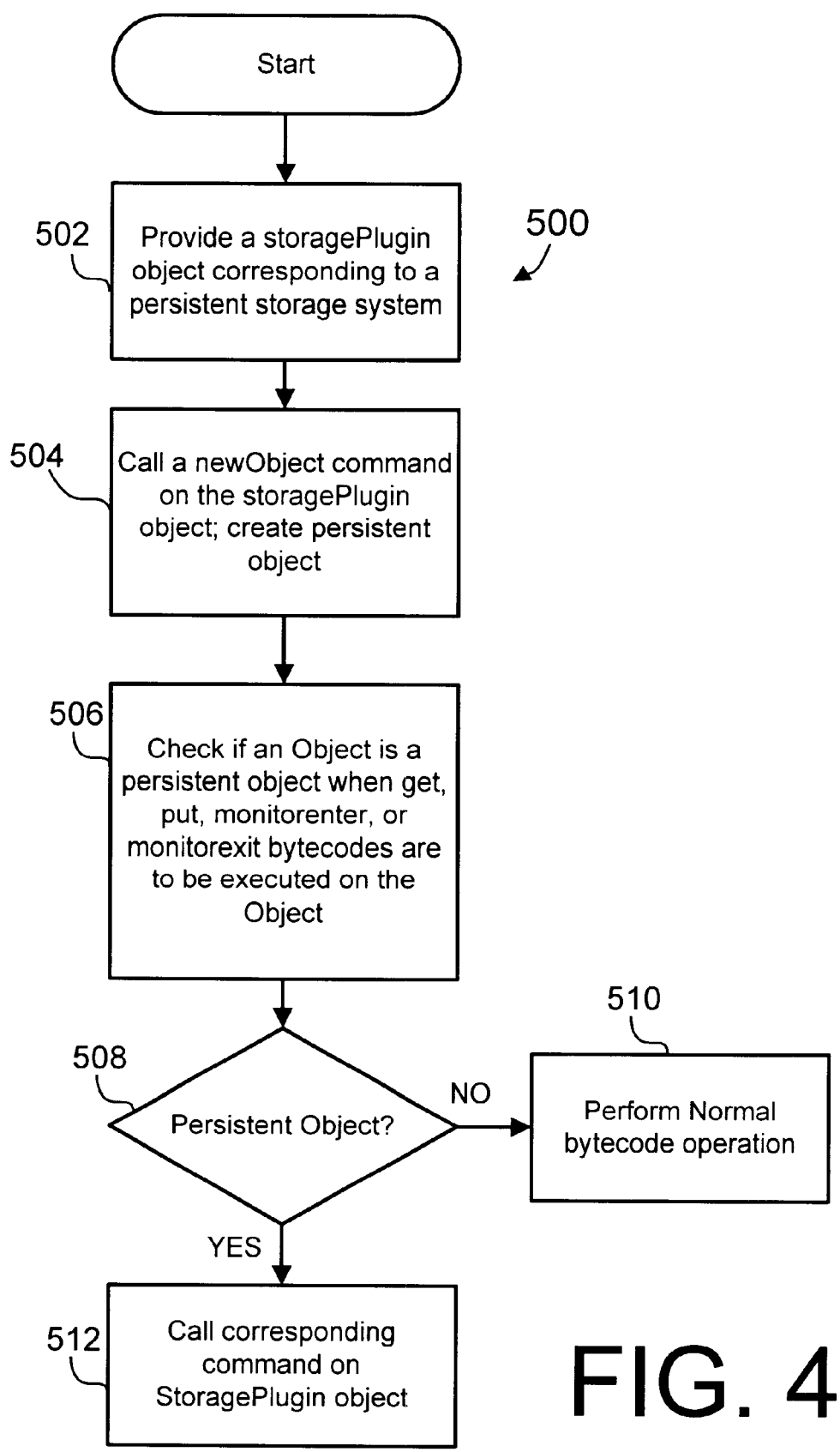
FIG. 4 is a flow diagram illustrating a persistent object method in accordance with the preferred embodiment.

Turning to FIG. 4, a method 500 for creating and operating with persistent Java objects in accordance with the preferred embodiment is illustrated. The first step 502 is to provide a StoragePlugin object corresponding to a particular persistent storage system. As discussed above the Storage-Plugin object is preferably implemented from a sub-class of objects corresponding to the type of persistent storage system and having implemented the commands described above. The next step 504 is to create a new persistent object using the newObject(javaclass) command on the Storage-Plugin object. This command creates the object of the specified class and stores it in the persistent storage system. Because the persistent object can be of any class and does not require any persistent-object mixin class, this object persistence is orthogonal to the class of the object.

The next step 506 is to check if an object is a persistent object whenever an operation is performed that would depend upon the persistence status of the object. In particular, when get, put, monitorenter and monitorexit operations are performed the JVM preferably checks to determine if the object is a persistent object. If the object is not persistent, then the operation is performed normally in step 510. If the object is persistent the corresponding command on the StoragePlugin object corresponding to the persistent object is called in step 512, and values retrieved, and the operation completed.

Thus, the preferred embodiment method and apparatus can be used to provide orthogonal persistence to Java objects. The preferred embodiment has the advantage of providing this persistence in a flexible yet consistent manner. While the invention has been particularly shown and described with reference to preferred embodiments Java system thereof, it will be understood by those skilled in the art that the invention is equally applicable to other programming languages. Thus, the preferred embodiment can be adapted to provide orthogonal persistence to any programming language that does not have its own persistence storage system. Furthermore, it will be understood that various other changes in form and details may be made therein without departing from the spirit and scope of the invention.

What is claimed is:

1. An apparatus comprising:
   at least one processor;
   a memory coupled to the at least one processor;
   a virtual machine residing in the memory;
   an object persistence mechanism residing in the memory, said object persistence mechanism including a storage plugin object and providing an interface to the virtual machine such that the storage plugin object can interface with the virtual machine and provide object persistence for a computer program running in the virtual machine, said object persistence mechanism creating a persistent object of a specified type when called by said computer program.

2. The apparatus of claim 1 wherein said object persistence mechanism provides object persistence orthogonal to said specified type of said persistent object.

3. The apparatus of claim 1 wherein said storage plugin object comprises at least one object instantiated from a class of objects defining commands available on said object persistence mechanism.

4. The apparatus of claim 2 wherein said at least one object comprises a C++ object.

5. The apparatus of claim 2 wherein said commands available on said object persistence mechanism include:
   a) a new command, wherein said object persistence mechanism creates a persistent object of a specified class when said new command is called; and
   b) a destroy command, wherein said object persistence mechanism deletes a specified persistent object when said destroy command is called.

6. The apparatus of claim 4 wherein said commands available on said object persistence mechanism further include:
   a) a get command, wherein said object persistence mechanism gets data of a specified type from a specified persistent object when said get command is called; and
   b) a put command, wherein said object persistence mechanism puts data of a specified type in a specified persistent object when said put command is called.

7. The apparatus of claim 5 wherein said commands available on said object persistence mechanism further include:
   a) a monitorenter command, wherein said object persistence mechanism locks a specified object from reading and writing when said monitorenter command is called; and
   b) a monitorexit command, wherein said object persistence mechanism unlocks a specified object to allow reading and writing when said monitorexit command is called.

8. The apparatus of claim 1 wherein said storage plugin object comprises a first object instantiated from a first sub-class of objects, said first sub-class of objects implementing commands defined in a class of objects for a first persistent storage system.

9. The apparatus of claim 7 wherein said object persistence mechanism further comprises a second storage plugin object instantiated from a second sub-class of objects, said second sub-class of objects implementing commands defined in said class of objects for a second persistent storage system.

10. The apparatus of claim 1 wherein said persistent object is a Java object.

11. The apparatus of claim 8 wherein said commands implemented in said first sub-class of objects and said second sub-class of objects include:
   i) a new command, wherein said object persistence mechanism creates an persistent object of a specified class when said new command is called;
   ii) a destroy command, wherein said object persistence mechanism deletes a specified persistent object when said destroy command is called;
   iii) a get command, wherein said object persistence mechanism gets data of a specified type from a specified persistent object when said get command is called;
   iv) a put command, wherein said object persistence mechanism puts data of a specified type in a specified persistent object when said put command is called;
   v) a monitorenter command, wherein said object persistence mechanism locks a specified object from reading and writing when said monitorenter command is called; and
   vi) a monitorexit command, wherein said object persistence mechanism unlocks a specified object to allow reading and writing when said monitorexit command is called.

12. A method for providing object persistence in a system, the method comprising the steps of:
   a) providing an object persistence mechanism including a storage plugin object and providing an interface to a virtual machine such that the storage plugin object can interface with the virtual machine and provide object persistence for a computer program running in the virtual machine;
   b) calling a new command on the object persistence mechanism specifying the class of persistent object to be created;
   c) checking if a object is a persistent object when a operation is to be executed on said object; and
   d) calling a command corresponding to said operation on said object persistent mechanism when said object is an persistent object.

13. The method of claim 12 wherein the step checking if a object is a persistent object when a operation is to be executed on said object comprises checking a object parameter specifying which, if any, storage plugin object the object is associated with.

14. The method of claim 12 wherein the step of calling a command corresponding to said operation on said object persistent mechanism when said object is an persistent object comprises calling a destroy object command wherein said object persistence mechanism deletes said persistent object.

15. The method of claim 12 wherein said persistent object is a Java object.

16. The method of claim 12 wherein the step of calling a command corresponding to said operation on said object persistent mechanism when said object is an persistent object comprises calling a get command wherein said object persistence mechanism gets data of a specified type from said persistent Object.

17. The method of claim 12 wherein the step of calling a command corresponding to said operation on said object persistent mechanism when said object is an persistent object comprises calling a put command wherein said object persistence mechanism puts data of a specified type in said persistent Object.

18. The method of claim 12 wherein the step of calling a command corresponding to said operation on said object persistent mechanism when said object is an persistent object comprises calling a monitorenter command wherein said object persistence mechanism locks said persistent object from reading and writing.

19. The method of claim 12 wherein the step of calling a command corresponding to said operation on said object persistent mechanism when said object is an persistent object comprises calling a monitorexit command wherein said object persistence mechanism unlocks said persistent object to allow reading and writing.

20. A program product comprising:
   (A) a object persistence mechanism, said object persistence mechanism including a storage plugin object and providing an interface to the virtual machine such that the storage plugin object can interface with a virtual machine and provide object persistence for a computer program running in the virtual machine, said object persistence mechanism creating a persistent object of a specified type when called by said computer program; and
   (B) signal bearing media bearing said object persistence mechanism.

21. The program product of claim 20 wherein the signal bearing media comprises recordable media.

22. The program product of claim 20 wherein the signal bearing media comprises transmission media.

23. The program product of claim 20 wherein said object persistence mechanism provides object persistence orthogonal to said specified type of said persistent object.

24. The program product of claim 20 wherein said persistent object is a Java object.

25. The program product of claim 20 wherein said object persistence mechanism comprises at least one object instantiated from a class of objects defining commands available on said object persistence mechanism.

26. The program product of claim 20 wherein said at least one object comprises a C++ object.

27. The program product of claim 20 wherein said commands available on said object persistence mechanism include:
   a) a new command, wherein said object persistence mechanism creates an persistent object of a specified class when said new command is called; and
   b) a destroy command, wherein said object persistence mechanism deletes a specified persistent object when said destroy command is called.

28. The program product of claim 27 wherein said commands available on said object persistence mechanism further include:
   a) a get command, wherein said object persistence mechanism gets data of a specified type from a specified persistent object when said get command is called; and
   b) a put command, wherein said object persistence mechanism puts data of a specified type in a specified persistent object when said put command is called.

29. The program product of claim 28 wherein said commands available on said object persistence mechanism further include:
   a) a monitorenter command, wherein said object persistence mechanism locks a specified object from reading and writing when said monitorenter command is called; and
   b) a monitorexit command, wherein said object persistence mechanism unlocks a specified object to allow reading and writing when said monitorexit command is called.

30. The program product of claim 20 wherein said object persistence mechanism comprises a first object instantiated from a first sub-class of objects, said first sub-class of objects implementing commands defined in a class of objects for a first persistent storage system.

31. The program product of claim 30 wherein said object persistence mechanism further comprises a second object instantiated from a second sub-class of objects, said second sub-class of objects implementing commands defined in said class of objects for a second persistent storage system.

32. The program product of claim 31 wherein said commands implemented in said first sub-class of objects and said second sub-class of objects include:
   i) a new command, wherein said object persistence mechanism creates an persistent object of a specified class when said new command is called;
   ii) a destroy command, wherein said object persistence mechanism deletes a specified persistent object when said destroy command is called;
   iii) a get command, wherein said object persistence mechanism gets data of a specified type from a specified persistent object when said get command is called;
   iv) a put command, wherein said object persistence mechanism puts data of a specified type in a specified persistent object when said put command is called;
   v) a monitorenter command, wherein said object persistence mechanism locks a specified object from reading and writing when said monitorenter command is called; and
   vi) a monitorexit command, wherein said object persistence mechanism unlocks a specified object to allow reading and writing when said monitorexit command is called.

33. An apparatus comprising:
   a) at least one processor;
   b) a memory coupled to the at least one processor;
   c) a virtual machine residing in said memory;
   d) a object persistence mechanism, said object persistence mechanism including at least one StoragePlugin object instantiated from a class of objects defining the commands available on said object persistence mechanism, said commands including:
      i) a new command, wherein said object persistence mechanism creates an persistent object of a specified class when said new command is called;
      ii) a destroy command, wherein said object persistence mechanism deletes a specified persistent object when said destroy command is called;
      iii) a get command, wherein said object persistence mechanism gets data of a specified type from a specified persistent object when said get command is called;

iv) a put command, wherein said object persistence mechanism puts data of a specified type in a specified persistent object when said put command is called;

v) a monitorenter command, wherein said object persistence mechanism locks a specified object from reading and writing when said monitorenter command is called; and vi) a monitorexit command, wherein said object persistence mechanism unlocks a specified object to allow reading and writing when said monitorexit command is called.

34. The apparatus of claim 33 wherein each of said at least one StoragePlugin object instantiated from a class of objects defining the commands available on said object persistence mechanism is assigned a parameter value, and wherein each persistent object is associated with the parameter value of its corresponding StoragePlugin object.

35. The apparatus of claim 33 wherein said virtual machine includes a new( ) bytecode, wherein said new( ) bytecode calls the new command on said StoragePlugin object when a new persistent object is to be created.

36. The apparatus of claim 33 wherein said virtual machine comprises a Java virtual machine.

37. The apparatus of claim 33 wherein said persistent objects comprise Java objects.

38. The apparatus of claim 33 wherein said virtual machine includes a monitorenter( ) bytecode and wherein said monitorenter( ) bytecode calls said monitorenter command on said StoragePlugin object when a persistent object is to be locked from reading and writing.

39. The apparatus of claim 33 wherein said virtual machine includes a monitorexit( ) bytecode and wherein said monitorexit( ) bytecode calls said monitorexit command on said StoragePlugin object when a persistent object is to be unlocked to allow reading and writing.

40. The apparatus of claim 33 wherein said StoagePlugin object includes a parameterized monitorenter(locklevel) command and wherein said monitorenter(locklevel) command locks a specified object from reading and writing when a first locklevel is specified and locks a specified object from writing only when a second locklevel is specified.

41. The apparatus of claim 40 wherein said virtual machine includes a parameterized monitorenter(locklevel) bytecode and wherein said parameterized ed monitorenter (locklevel) bytecode calls said parameterized monitorenter (locklevel) command on said StoragePlugin with a first locklevel specified when an object is to be locked from reading and writing and with a second locklevel specified when an object is to be locked from writing only.

42. The apparatus of claim 33 wherein said StoragePlugin object includes a parameterized monitorexit(locklevel) command and wherein said monitorexit(locklevel) command unlocks a specified object to allow reading and writing when a first locklevel is specified and unlocks a specified object to allow reading only when a second locklevel is specified.

43. The apparatus of claim 42 wherein said virtual machine includes a parameterized monitorexit(locklevel) bytecode and wherein said parameterized monitorexit (locklevel) bytecode calls said parameterized monitorexit (locklevel) command on said StoragePlugin with a first locklevel specified when an object is to be unlocked to allow reading and writing and with a second locklevel specified when an object is to be unlocked to allow reading only.

44. The apparatus of claim 33 wherein said virtual machine includes a garbage collector that deletes objects no longer needed in said virtual machine, and wherein said garbage collector calls said destroy command and wherein said object persistence mechanism deletes a specified persistent object when said destroy command is called.

45. A method for providing orthogonal object persistence in a system, the method comprising the steps of:

a) providing an object persistence mechanism including at least one storage plugin object and providing an interface to a virtual machine such that the at least one storage plugin object can interface with the virtual machine and provide object persistence for a computer program running in the virtual machine;

b) calling a new command on associated one of the at least one storage plugin objects specifying the class of persistent object to be created, the associated storage plugin object providing object persistence for the persistent object;

c) checking if a object is a persistent object when a bytecode is to be executed on said object;

d) calling a get command on said object persistence mechanism, wherein said object persistence mechanism gets data of a specified type from said persistent object e) calling a put command on said object persistence mechanism wherein said object persistence mechanism puts data of a specified type in said persistent object;

f) calling a monitorenter command on said object persistence mechanism wherein said object persistence mechanism locks said persistent object from reading and writing; and g) calling a monitorexit command on said object persistence mechanism wherein said object persistence mechanism unlocks said persistent object to allow reading and writing.

46. The method of claim 45 wherein said system is a Java system and said persistent object is a Java object.

47. The method of claim 45 wherein the step checking if a object is a persistent object when a bytecode is to be executed on said object comprises checking an object parameter specifying which, if any, storage plugin object the object is associated with.

48. The method of claim 45 further comprising the step of calling a destroy object command on said object persistence mechanism, wherein said object persistence mechanism deletes said persistent object.

49. The method of claim 45 further comprising the step of calling a parameterized monitorenter(locklevel) command on said object persistence mechanism wherein said monitorenter(locklevel) command locks a specified object from reading and writing when a first locklevel is specified and locks a specified object from writing only when a second locklevel is specified.

50. The method of claim 45 further comprising the step of calling a parameterized monitorexit(locklevel) command wherein said monitorexit(locklevel) command unlocks a specified object to allow reading and writing when a first locklevel is specified and unlocks a specified object to allow reading only when a second locklevel is specified.

51. A program product comprising:

A) a virtual machine;

B) a object persistence mechanism, said object persistence mechanism including at least one StoragePlugin object instantiated from a class of objects defining the commands available on said object persistence mechanism, said commands including:

i) a new command, wherein said object persistence mechanism creates an persistent object of a specified class when said new command is called;

ii) a destroy command, wherein said object persistence mechanism deletes a specified persistent object when said destroy command is called;

iii) a get command, wherein said object persistence mechanism gets data of a specified type from a specified persistent object when said get command is called;

iv) a put command, wherein said object persistence mechanism puts data of a specified type in a specified persistent object when said put command is called;

v) a monitorenter command, wherein said object persistence mechanism locks a specified object from reading and writing when said monitorenter command is called; and vi) a monitorexit command, wherein said object persistence mechanism unlocks a specified object to allow reading and writing when said monitorexit command is called; and (C) signal bearing media bearing said virtual machine and said object persistence mechanism.

52. The program product of claim 51 wherein the signal bearing media comprises recordable media.

53. The program product of claim 51 wherein the signal bearing media comprises transmission media.

54. The program product of claim 51 wherein each of said at least one StoragePlugin object instantiated from a class of objects defining the commands available on said object persistence mechanism is assigned a parameter value, and wherein each persistent object is associated with the parameter value of its corresponding StoragePlugin object.

55. The program product of claim 51 wherein said virtual machine comprises a Java virtual machine.

56. The program product of claim 51 wherein said persistent objects comprise Java objects.

57. The program product of claim 51 wherein said virtual machine includes a new( ) bytecode, wherein said new( ) bytecode calls the new command on said StoragePlugin object when a new persistent object is to be created.

58. The program product of claim 51 wherein said virtual machine includes a monitorenter( ) bytecode and wherein said monitorenter( ) bytecode calls said monitorenter command on said StoragePlugin object when a persistent object is to be locked from reading and writing.

59. The program product of claim 58 wherein said virtual machine includes a monitorexit( ) bytecode and wherein said monitorexit( ) bytecode calls said d monitorexit command on said StoragePlugin object when a persistent object is to be unlocked to allow reading and writing.

60. The program product of claim 59 wherein said StoragePlugin object includes a parameterized monitorenter (locklevel) command and wherein said monitorenter (locklevel) command locks a specified object from reading and writing when a first locklevel is specified and locks a specified object from writing only when a second locklevel is specified.

61. The program product of claim 60 wherein said virtual machine includes a parameterized monitorenter(locklevel) bytecode and wherein said parameterized monitorenter (locklevel) bytecode calls said parameterized monitorenter (locklevel) command on said StoragePlugin with a first locklevel specified when a n object is to be locked from reading and writing and with a second locklevel specified when an object is to be locked from writing only.

62. The program product of claim 51 wherein said StoragePlugin object includes a parameterized monitorexit (locklevel) command and wherein said monitorexit (locklevel) command unlocks a specified object to allow reading and writing when a first locklevel is specified and unlocks a specified object to allow reading only when a second locklevel is specified.

63. The program product of claim 62 wherein said virtual machine includes a parameterized monitorexit(locklevel) bytecode and where in said parameterized monitorexit (locklevel) bytecode calls said parameterized monitorexit (locklevel) command on said StoragePlugin with a first locklevel specified when an object is to be unlocked to allow reading and writing and with a second locklevel specified when an object is to be unlocked to allow reading only.

64. The program product of claim 51 wherein said virtual machine includes a garbage collector that deletes objects no longer needed in said virtual machine, and wherein said garbage collector calls said destroy command and wherein said object persistence mechanism deletes a specified persistent object when said destroy command is called.

* * * * *

UNITED STATES PATENT AND TRADEMARK OFFICE
CERTIFICATE OF CORRECTION

PATENT NO. : 6,339,782 B1
DATED : January 15, 2002
INVENTOR(S) : Scott Neal Gerard and Steven Lester Halter It is certified that error appears in the above-identified patent and that said Letters Patent is hereby corrected as shown below:

Column 15,
Line 46, replace "parameterized ed monitorenter(locklevel)" with -- parameterized monitorenter(locklevel) --.

Column 18,
Line 1, replace "58" with -- 51 --.
Line 3, replace "said d monitorexit" with -- said monitorexit --.
Line 6, replace "59" with -- 51 --.
Line 18, replace "when a n object" with -- when an object --.
Line 30, replace "where in" with -- wherein --.

Signed and Sealed this

Tenth Day of September, 2002

*Attest:*

*Attesting Officer*

JAMES E. ROGAN
*Director of the United States Patent and Trademark Office*